May 26, 1936.  T. W. HAGUE  2,042,256
GRAIN CROP HEADER
Filed Sept. 13, 1934  2 Sheets-Sheet 1
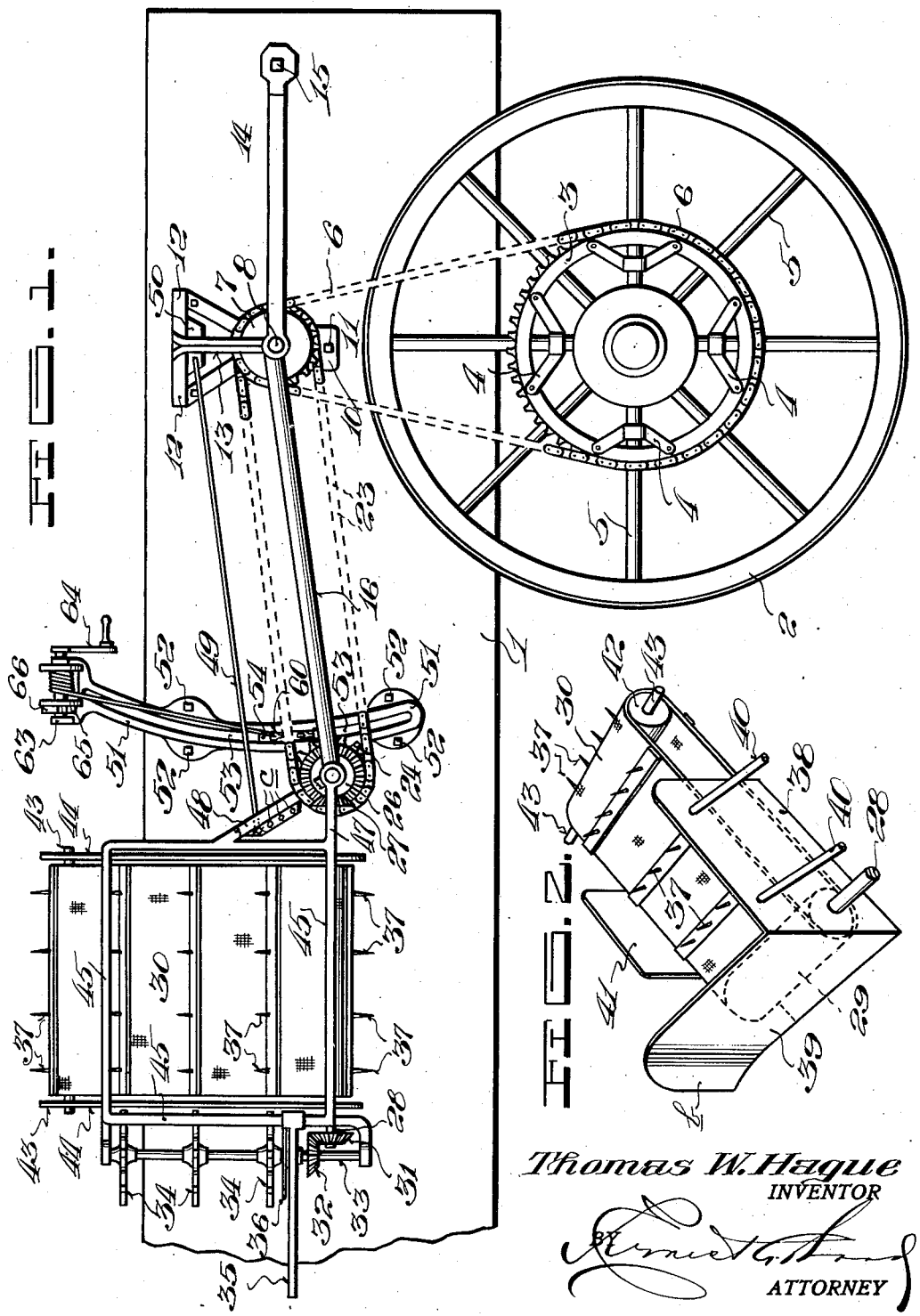
Thomas W. Hague
INVENTOR
ATTORNEY May 26, 1936.　　　T. W. HAGUE　　　2,042,256
GRAIN CROP HEADER
Filed Sept. 13, 1934　　　2 Sheets-Sheet 2
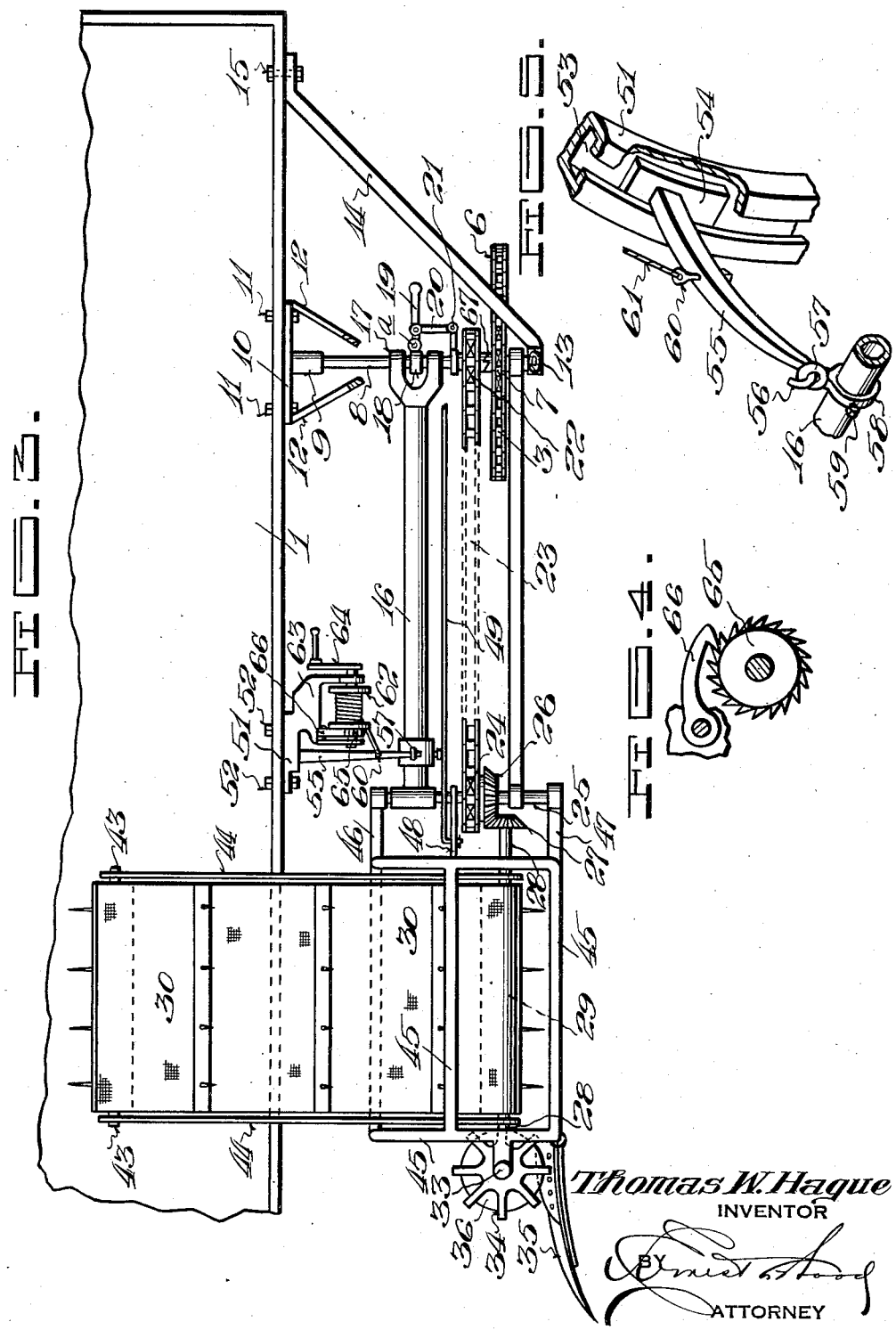
Thomas W. Hague
INVENTOR
ATTORNEY Patented May 26, 1936

2,042,256

UNITED STATES PATENT OFFICE 2,042,256

GRAIN CROP HEADER

Thomas W. Hague, Fort Worth, Tex.

Application September 13, 1934, Serial No. 743,794

5 Claims. (Cl. 56—56)

This invention relates to feed and grain headers and it has particular reference to a machine designed as an attachment to be affixed to a wagon box for the purpose of heading maize, kaffir corn, cane and other analogous vegetation suitable for forage.

The principal object of the invention is to provide an attachment of the character specified which is simple in construction and operation and whose weight is not such as to overburden draft animals or a tractor as the case may be and the power required to operate the same is negligible.

Another object of the invention is to provide a wagon box header whose cutting and elevating units are always maintained on an operative plane regardless of the required movements vertically to which they are subjected and which are necessary due to varying heights of the stalks bearing the heads.

Still another object of the invention is to provide means for raising and lowering the cutting and elevating elements as well as means by which to guide these elements in a predetermined path and to maintain them in operative relationship with the stalks of vegetation.

With the foregoing objects as paramount, the invention has particular reference to its salient features of construction and arrangement of parts which will become manifest as the description proceeds, taken in connection with the accompanying drawings, wherein:—

Figure 1 is a fragmentary elevational view of a wagon box and rear wheel showing the invention applied.

Figure 2 is a detail view in perspective showing the elevating means and guide by which the heads are constrained to move into the operative radius of the cutting element.

Figure 3 is a fragmentary plan view of the wagon box showing the invention attached.

Figure 4 is a detail view of the ratchet and ball mechanism for controlling the movements of the raising and lowering means, and Figure 5 is a fragmentary view of the guide for the raising and lowering means.

Continuing with a more detailed description of the drawings, 1 designates a wagon box or bed mounted upon the wheels 2. The wheel 2 in Figure 3 is omitted since to show the same would confuse the details.

A sprocket wheel 3 is affixed by means of a series of yokes 4 to the spokes 5 of the said wheel 2. The sprocket wheel 3 is thus made rigid with respect to the wheel 2. A chain 6 surrounds this sprocket 3 and a smaller sprocket 7 mounted upon a horizontal shaft 8 extending laterally from the wagon box 1. The shaft 8 is journaled in a box 9, shown in Figure 3, the latter being rigid with a bracket 10 which is affixed by means of bolts 11 to the wagon box 1.

A pair of braces 12 extend outwardly from the bracket 10 and is so disposed that their outer ends will depend at 13 and embrace the outer extremity of the shaft 8. An oblique brace 14 is affixed by means of bolt 15 to the wagon box and is likewise secured to the outer end of the shaft 8. Thus a three point securement of the shaft 8 is provided which sufficiently rigidifies the same against displacement.

A rod or hollow shaft 16 is provided at one end with a bifurcated bearing 17, shown in Figure 3, the latter rotatably embracing shaft 8. A collar 18 surrounds the shaft 8 intermediate the arms of the bifurcated bearing 17 and has bifurcated connections thereto at $a$ a clutch lever 19. A link 20 is pivotally joined to this lever and has operative connection with the clutch collar 21 on which is freely mounted the sprocket 22. A chain 23 surrounds this sprocket 22 and a similar sprocket 24 mounted on a stub shaft 25. A beveled gear 26 is mounted integral with or connected to the sprocket 24 so that it will be driven by the said sprocket 24 and rotary motion is thus imparted to the beveled gear 27.

The beveled gear 27 is mounted upon shaft 28, the latter affording an axis for the roller 29 over which is mounted the endless belt 30. On the opposite end of the shaft 28 there is mounted a beveled gear 31, shown in Figure 1, which engages a similar gear 32 mounted on a vertical shaft 33.

Also carried by the shaft 33 is a series of finger wheels 34 which may be hereinafter termed guide wheels. These wheels perform the function of engaging and bringing the stalks of vegetation into the operative radius of the curved blade 35 after which they are severed between this blade and a sharpened disc 36, the latter rotating in unison with the guide wheels 34, it being noted that the disc is mounted on the shaft 33.

After having been severed from the stalks the heads fall upon the endless belt or elevator 30 and are carried upward and dumped into the wagon box 1. A series of prongs or projections 37 prevent the heads from falling as the belt 30 conveys them upward.

Embracing one side and end of the elevator 30 are plates 38 and 39 respectively. Plate 39 is curved outwardly at $b$ so as to guide the heads toward the cutting point and the plate 38, which is braced by rods 40, prevents the heads from falling off one side of the elevator 30. A plate 41 is also disposed on the opposite side of the elevator for the same purpose. It will be noted that a roller 42 is provided at the upper end of the endless belt 30 and the ends of its shaft 43 are journaled in the frame 44 which maintains spacing of the rollers 29 and 42.

It will be noted in both Figures 1 and 3 that a frame 45 embraces the operative end of the elevator 30 and a portion 46 thereof (see Figure 3) embraces one end of the shaft 25 while a portion 47 thereof embraces the outer end of this shaft. An arm 48 is joined to and extends downwardly at an angle from the frame 45 and, as apparent in Figure 1 is provided with a series of apertures c in one of which is engaged the end of a rod 49, the latter extending to the rear to a projection 50 supported by the brace members 12 and to this projection the rod 49 is pivotally projected.

It is apparent from the foregoing that movements of the rod or shaft 16 and the rod 49 will be at all times parallel and due to their pivotal points at either end, the operative plane of the elevator 30 will be substantially horizontal regardless of the limited movements of these said rods. At the same time, the rod 49 serves to support the elevator and cutting element, each of which may be adjusted as to the angle in which it operates by changing the end of the rod 49 with respect to the apertures c in the arm 48.

As a guide for the raising and lowering movements of the elements described, an arcuate shaped casting 51 is affixed by means of bolts 52 to the side of the wagon box 1. An examination of Figure 5 will show that this casting is so shaped as to define a channel 53 from one end to the other. Within this channel there is provided a slide or shoe 54 to which is attached an arm 55 having a hook 56 at the end thereof. This hook engages an eye 57 attached to a collar 58 which is secured in position on the rod 16 by means of a set screw 69. An eye 60 is affixed to the arm 55 and to this eye is connected a cable 61, the latter extending upwardly and is wound upon a spool 62, the latter being supported by the casting 63, which is preferably integral with the arcuate casting 51. A crank 64 is provided for rotating the spool 62.

In Figure 4 is shown in detail a ratchet wheel 65 which is mounted upon and rigid with the shaft which serves as an axis for the spool 62. A pawl 66 is in control of this ratchet. The entire mass is raised and lowered by rotating the crank 64 and when so moved, the rear shaft 8 is the pivotal point although, the parallel relationship of the rods 16 and 49 causes slight pivotal displacement of the frame 45 with respect to the shaft 25. This displacement maintains the elevator and cutting element in a substantially horizontal and therefore practical plane for cutting and elevating the heads as they move into the operative radius of the guide wheel 34, cutting disc 36 and blade 35.

From the foregoing it will be seen that traction of the wheels 2 will impart rotary motion to the sprocket 7 which is rigid with the clutch element 67 on the shaft 8. When the lever 19 is moved to such position as to cause the companion clutch element to move into engagement with the element 67, the sprocket 22 is rotated, which imparts rotation to the sprocket 24 through chain 23. The beveled gear 26 is thus rotated to impart rotation to the shaft 28 and gear assembly 31—32 through the gear 27. The guide wheels 34, cutting disc 36 and elevator 30 are thus all set into operation to effect severing of the heads from the stalks and elevating the same to and depositing them in the wagon box 1. Should the height of the stalks vary considerably, it is required only to lift the pawl 66 in Figure 4 and rotate the spool 62 to raise and lower the cutting element in accordance with the varying height of the stalks.

Manifestly, the construction shown is capable of considerable modification and such modification as is considered within the scope and meaning of the appended claims is also considered within the spirit and intent of the invention.

What is claimed is:

1. A crop feed header including in combination with a wagon box, a shaft journaled in a bearing affixed to the side of said box and extending outwardly therefrom, a rod pivoted to and extending forwardly of said shaft and engaging a second shaft in parallel relationship with said first shaft, a pair of rollers forwardly and at right angles to said second shaft and having an endless belt surrounding the same, one of said rollers being disposed at a higher level than the other, a frame embracing the lowermost of said rollers and having pivotal connection with said second shaft, means in parallel relationship with said rod and engaging said frame, a cutting blade and a rotary cutting disc, a series of rotary guide members disposed in spaced relationship above said cutting disc, means for imparting rotary motion to said cutting disc and guide members and means for raising and lowering said blade, cutting disc, guide members and endless belt as a unit.

2. A wagon box header including in combination with said wagon box, an elevator, a frame embracing the receiving end of said elevator, a cutting disc disposed adjacent said elevator, a vertically disposed shaft mounted in said frame for carrying said cutting disc, a series of spaced guide members for moving heads into the operative radius of said cutting disc to be received by said elevator, means for imparting rotary motion to said cutting disc, guide members and elevator simultaneously, means for raising and lowering said elevator frame and cutting means, means for maintaining said elevator and cutting means in substantially a horizontal plane during movements thereof and means for preventing lateral movement of said elevator with respect to said wagon box.

3. An attachment for wagon boxes for cutting and depositing maize heads and the like into said wagon box including a vertically movable frame having an elevating means and a cutting means disposed adjacent the lowermost end of said elevating means, a series of rotary guide members cooperating with said cutting means, means supporting said frame at a point spaced rearwardly of said elevator, means intermediate said supporting means and said elevator for raising and lowering said elevator and cutting means as a unit, means for maintaining said elevating means on a substantially horizontal plane, means for guiding the raising and lowering movements of said elevating means to prevent displacement thereof relative to said wagon box, said means comprising an arcuately channeled member affixed to said wagon box and carrying said raising and lowering means, and means for imparting rotary motion to said cutting means, guide members and elevating means simultaneously.

4. A feed header in combination with a wagon box including a stationary shaft and an arcuately movable shaft having relative connection, a frame carried by said movable shaft, a head severing means carried by said frame, a series of horizontally spaced and rotary guide members cooperating with said head severing means, an endless belt operating over rollers journaled in said frame, means for effecting arcuate movement of said movable shaft with respect to said stationary shaft to change the position of said frame relative to said wagon box, means for maintaining said frame in a substantially horizontal plane during said movement, an arcuately shaped guide member for maintaining said frame in spaced relation to said wagon box and means for operating said rotary guide members and elevator in unison.

5. A wagon box header including in combination with a wagon box, a frame constrained against other than vertical movement, an elevator arranged in said frame, a cutting disc disposed on a vertical shaft at one side of said elevator, a series of rotary guide members arranged to move heads into the operative radius of said cutting disc, a shaft connected to and extending outwardly from said wagon box rearwardly of said elevator, a pair of parallel arms connecting said shaft and said vertically movable frame, means for raising and lowering said elevator and cutting means as a unit and means for holding said elevator and cutting means against lateral movement relative to said wagon box during the raising and lowering operations.

THOMAS W. HAGUE.